(No Model.) 7 Sheets—Sheet 1.

J. B. ARCHER.
APPARATUS FOR MANUFACTURING GAS.

No. 434,621. Patented Aug. 19, 1890.

Witnesses
Inventor
John B. Archer.
By C. S. Whitman
Attorney

THE NORRIS PETERS CO., PHOTO-LITHO., WASHINGTON, D. C.

(No Model.) 7 Sheets—Sheet 2.
J. B. ARCHER.
APPARATUS FOR MANUFACTURING GAS.
No. 434,621. Patented Aug. 19, 1890.

Witnesses

Inventor
John B. Archer.
C. S. Whitman
Attorney (No Model.) 7 Sheets—Sheet 3.

J. B. ARCHER.
APPARATUS FOR MANUFACTURING GAS.

No. 434,621. Patented Aug. 19, 1890.

Witnesses
Fred Heller
Vernon M. Horsey

Inventor
John B. Archer
By C. S. Whitman
Attorney (No Model.) 7 Sheets—Sheet 4.
J. B. ARCHER.
APPARATUS FOR MANUFACTURING GAS.

No. 434,621. Patented Aug. 19, 1890.

Witnesses
Inventor
John B. Archer
By C. S. Whitman
Attorney (No Model.) 7 Sheets—Sheet 5.

J. B. ARCHER.
APPARATUS FOR MANUFACTURING GAS.

No. 434,621. Patented Aug. 19, 1890.

Witnesses

Inventor
John B. Archer
By C. S. Whitman
Attorney (No Model.) 7 Sheets—Sheet 6.
J. B. ARCHER.
APPARATUS FOR MANUFACTURING GAS.
No. 434,621. Patented Aug. 19, 1890.

Witnesses
Inventor
John B. Archer
By C. S. Whitman
Attorney (No Model.) J. B. ARCHER. 7 Sheets—Sheet 7.
APPARATUS FOR MANUFACTURING GAS.
No. 434,621. Patented Aug. 19, 1890.
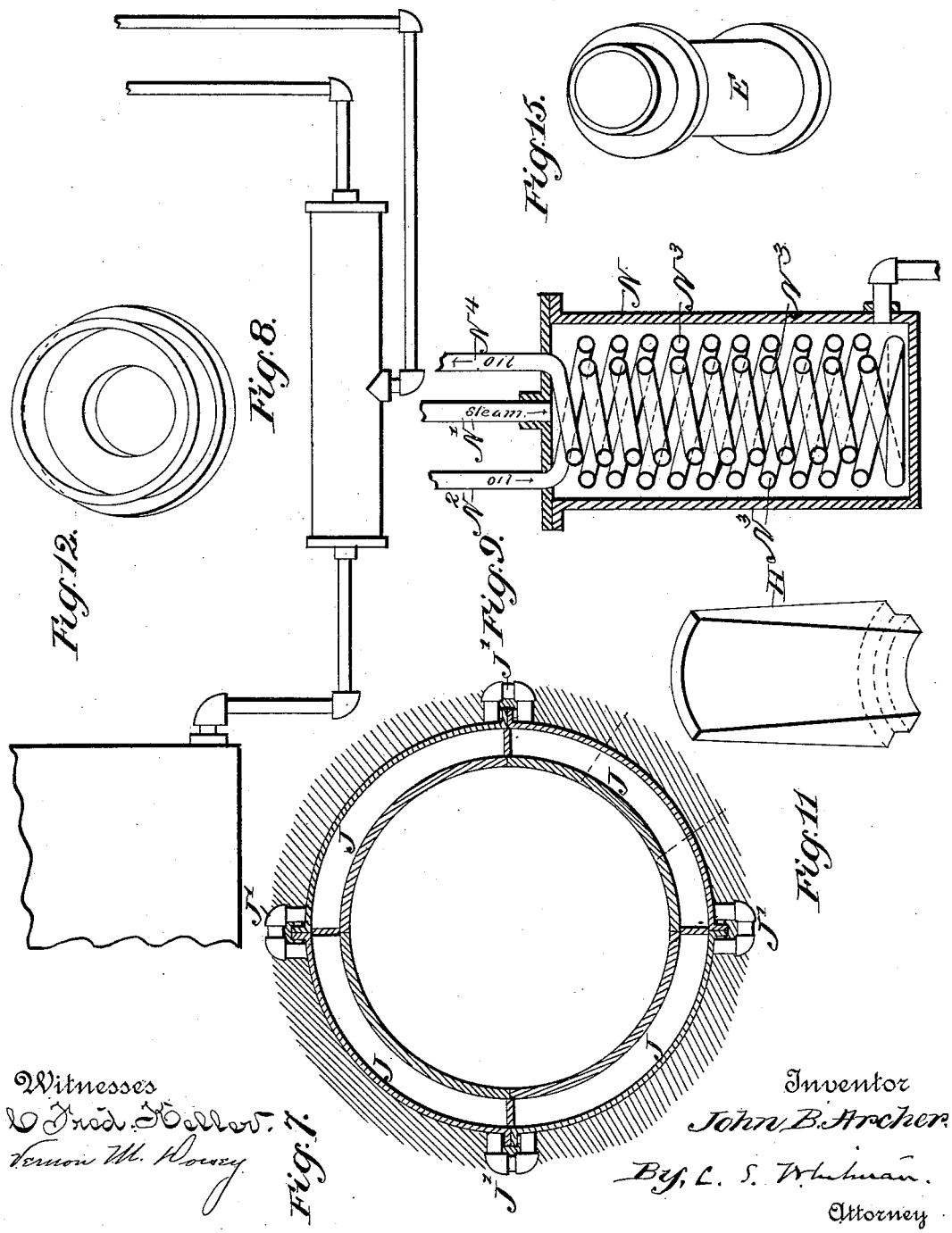

UNITED STATES PATENT OFFICE.

JOHN B. ARCHER, OF WASHINGTON, DISTRICT OF COLUMBIA.

APPARATUS FOR MANUFACTURING GAS.

SPECIFICATION forming part of Letters Patent No. 434,621, dated August 19, 1890.

Application filed February 21, 1888. Serial No. 264,822. (No model.)

*To all whom it may concern:*

Be it known that I, JOHN B. ARCHER, a citizen of the United States, residing at Washington, in the District of Columbia, have invented certain new and useful Improvements in Apparatus for Manufacturing Gas; and I do hereby declare the following to be a full, clear, and exact description of the invention, such as will enable others skilled in the art to which it appertains to make and use the same.

The present invention is an improvement upon that for which Letters Patent Nos. 341,624, 341,625, 341,627, and 341,629 were granted to me on the 11th day of May, 1886.

My invention relates to that class of apparatus for manufacturing gas in which the decomposition of water is effected, and in which the gaseous products in a measure result from the interaction of steam and carbon; and my invention consists in an improved apparatus for the economical manufacture of gas for heating and illuminating purposes by converting in a gradual manner steam or water and hydrocarbon oil into a fixed gas, which may be used in furnaces for forging, welding, crucible steel melting, and other metallurgical processes. In this apparatus the dissociation of steam for the production of hydrogen gas and the volatilization of the liquid hydrocarbons is effected in the manner hereinafter described.

Figure 1:
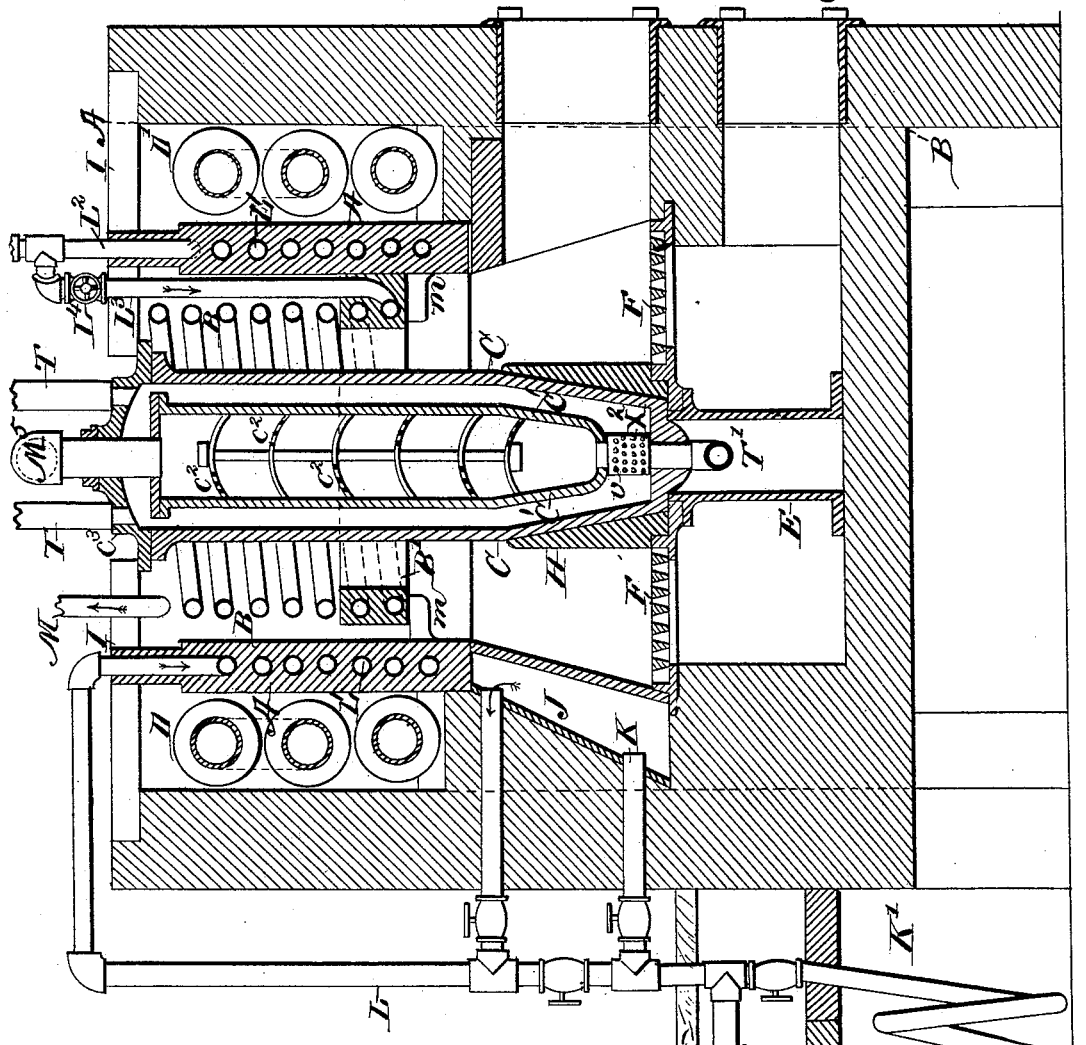
Figure 2:
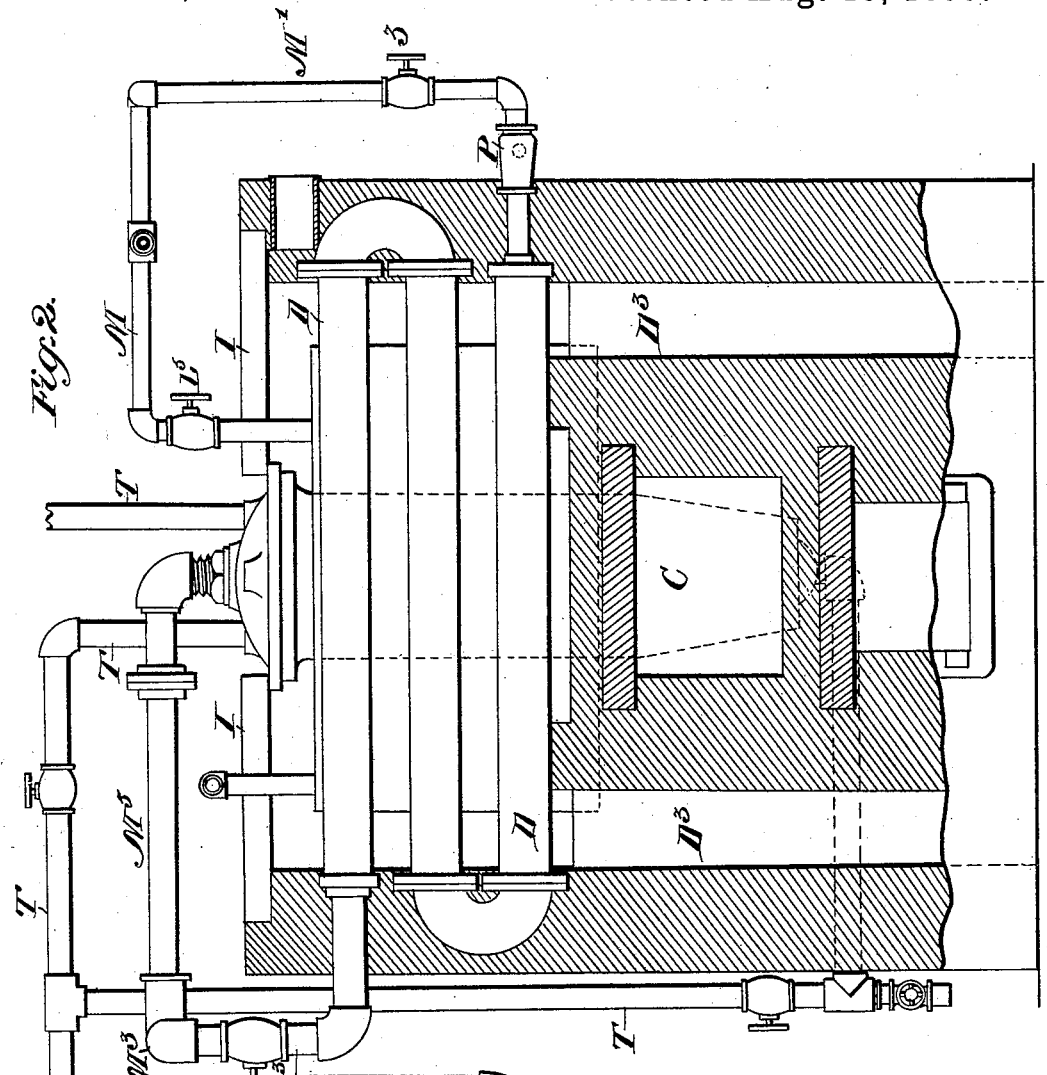
Figure 10:
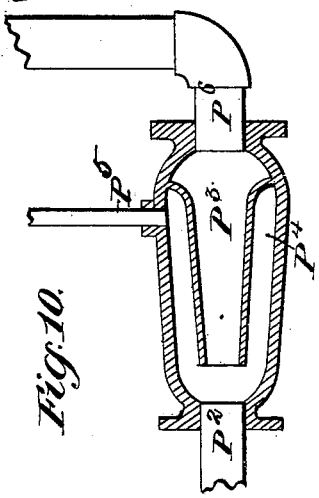
Figure 3:
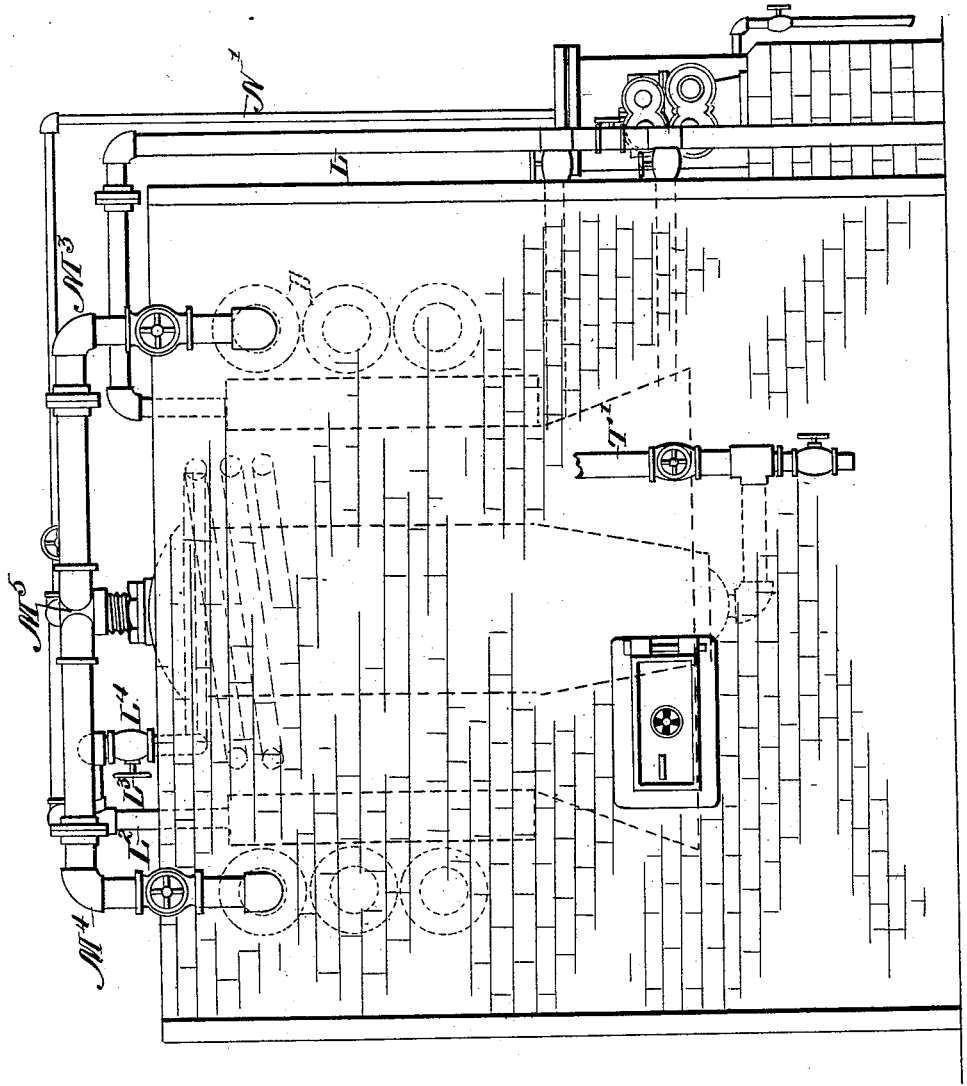
Figure 4:
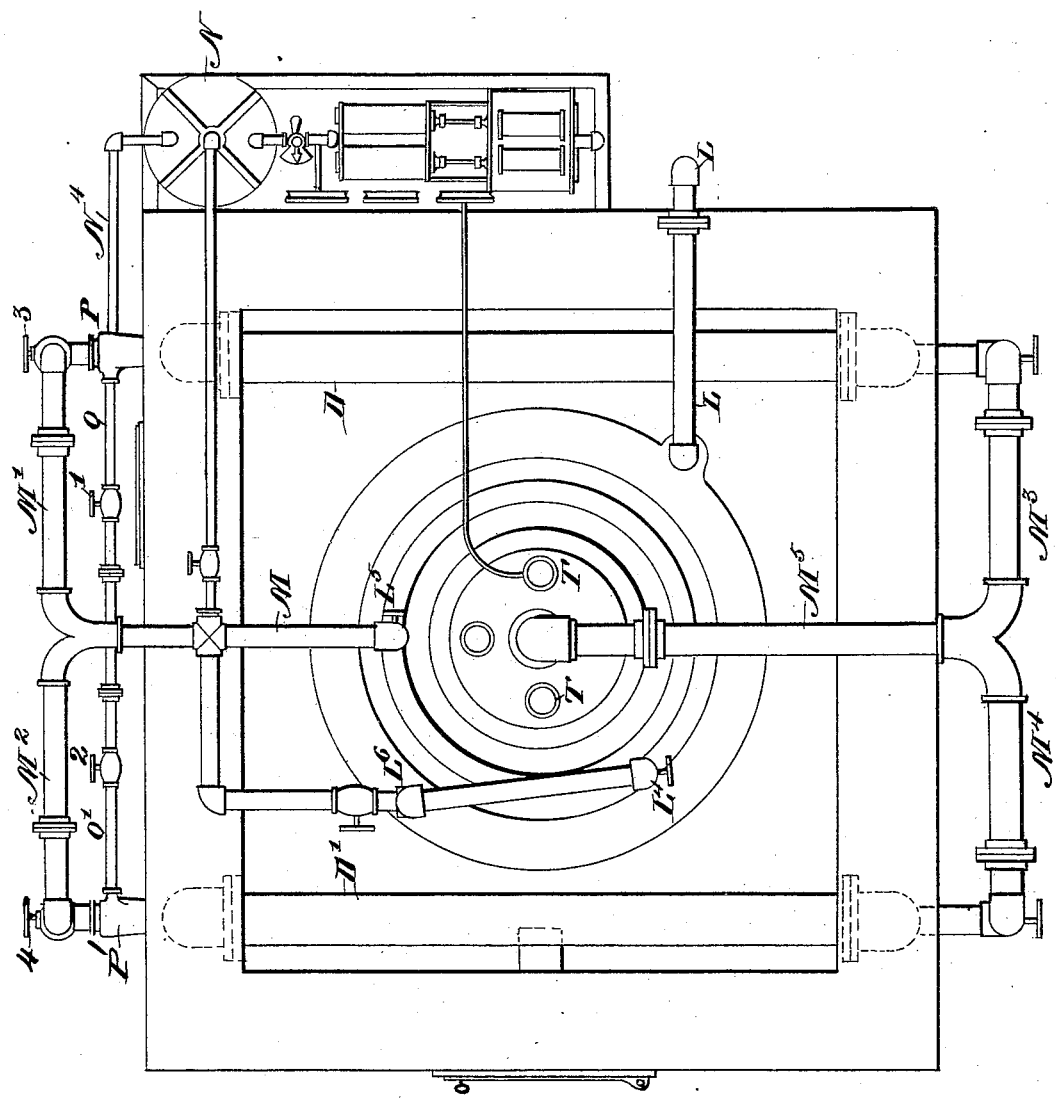
Figure 5:
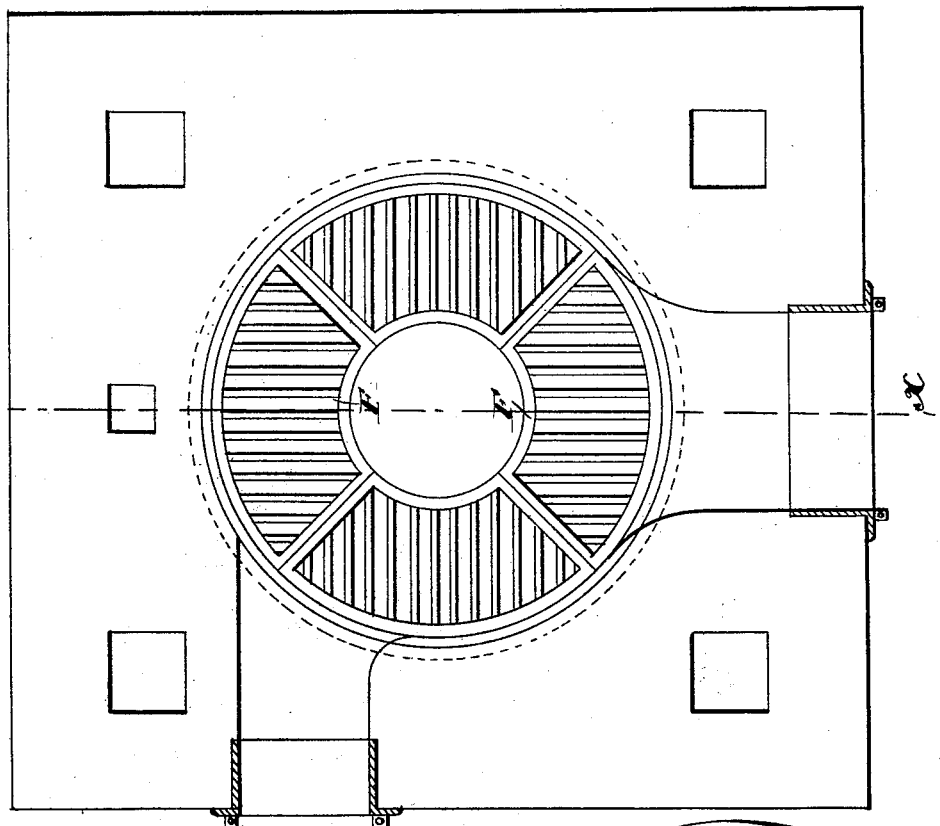
Figure 14:
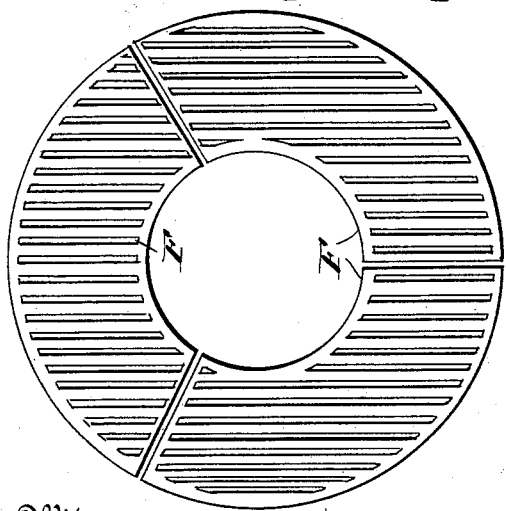
Figure 13:
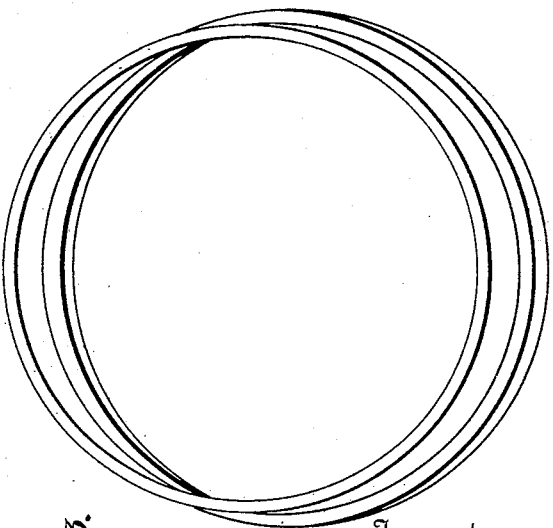
Figure 6:
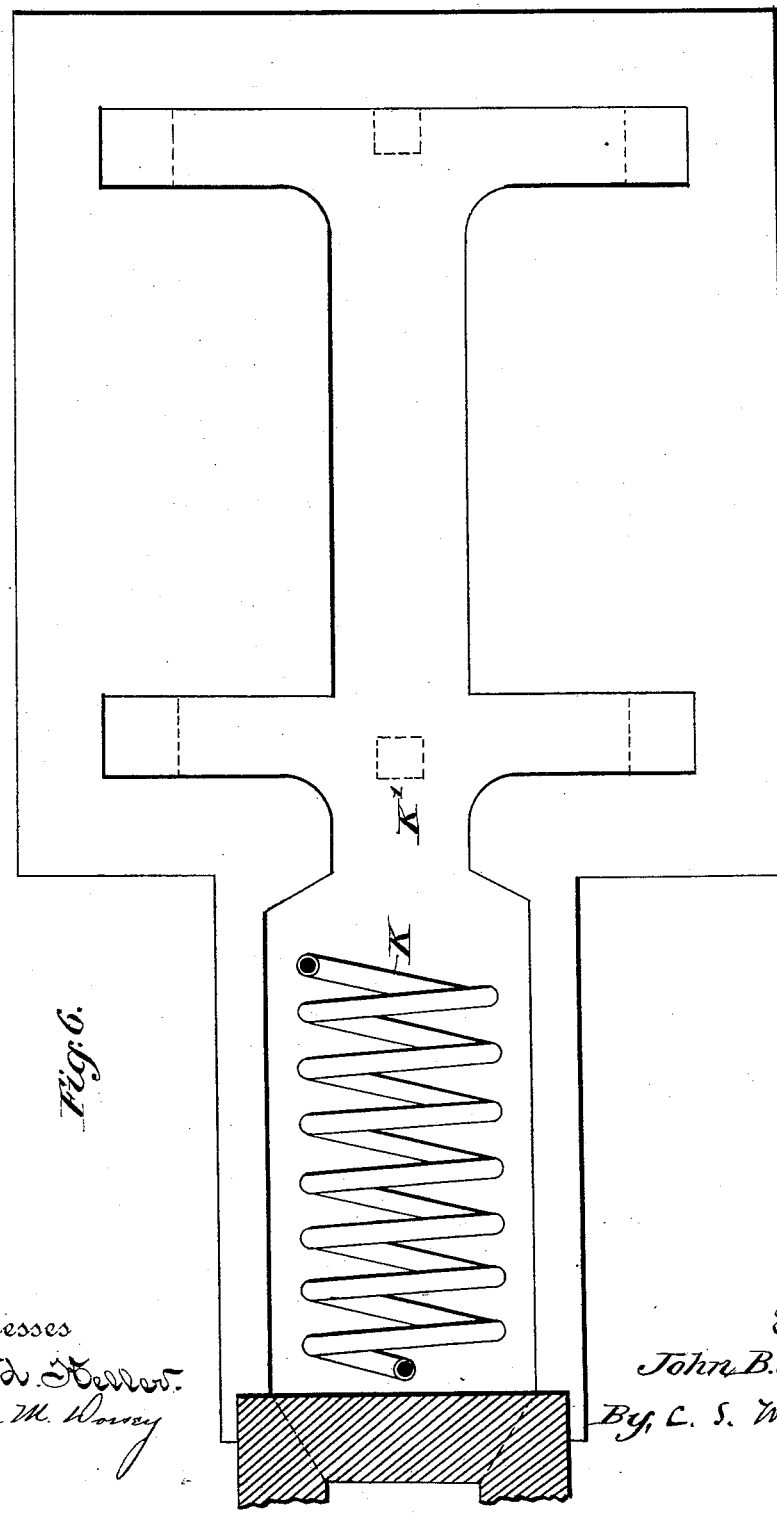

In the accompanying drawings, in which corresponding parts are designated by similar letters, Figure 1 is a vertical section taken on the line $x\,x$ of Fig. 5. Fig. 2 is a section taken on the line $A^9\,B^9$ of Fig. 1. Fig. 3 is a rear elevation. Fig. 4 is a plan with the tile-cover removed. Fig. 5 is a plan showing the grate-bars. Fig. 6 is a plan of the foundation. Fig. 7 is a detail view illustrating the superheater or boiler around the fire-box. Fig. 8 illustrates the apparatus for pumping the oil. Fig. 9 is the oil-heater. Fig. 10 illustrates in detail the injector. Fig. 11 represents one of the protecting-tiles. Figs. 12 and 13 show in perspective, respectively, the inner and outer rings which support the grate-bars. Fig. 14 represents the grate-bars. Fig. 15 is a perspective view of the tubular support of the vertical retort.

The upper portion of the interior of the brick-work furnace structure $A^8$ is divided into compartments by the annular wall A, the top of which is some distance below the lower surface of the removable tiles I. In the inner one of the compartments thus formed are the inner spiral steam-superheating pipes B and the vertical retorts C C', while the outer compartment contains the two gangs of horizontal retorts D D'.

Upon the tubular support E rests the grate-bars F, constructed in four sections, as in Fig. 5, or three, as in Fig. 14, the retort C and the four tiles H constructed of fire-clay or other refractory substance, which protect the bottom of the retort C from the flame. By this construction a compact and stable support is secured for the grate-bars and retort, and the sides and bottom of the latter are fully protected. The inner tubular retort C' contains a series of curved partition-plates $O^2$, in which alternating apertures are cut. This inner retort may be removed with facility from the outer one by lifting the removable tiles I and detaching the cap-piece $C^3$.

Around the fire-box is arranged the annular steam-superheater, the construction of which is best shown in section in Fig. 7, and which consists of four chambers J J J J, communicating with each other by means of the tubes J' J' J' J'. This superheater communicates with the steam-supply by means of the pipe K, which may be coiled within the chimney K', as shown, in such a manner as to be heated by the escaping products of combustion. The steam passes from the chambers J through the pipe L and outer coil L' to the inner spiral steam-superheating pipes B, the lower coils of which are inclosed in a cast-iron casing B' to protect them from the action of the flame, and which rests upon the lugs or projections $m$. After being heated in the inside coil B, the steam leaves by the pipe M and flows through the branch pipes M' $M^2$ to the gangs of horizontal retorts D D'. The oil, after being heated in the oil-heater N, passes through the pipe $N^4$ to the branch pipes O O', and from thence to the gangs of horizontal retorts D D'. Injectors P P' are located at the junction of the steam-pipes M' $M^2$ and oil-pipes O O', one of which is illustrated in Fig. 10. This injector has a nozzle $P^3$, entrance and exit openings $P^5$ $P^6$ $P^2$, and a chamber P⁴. As the steam passes through the nozzle P³, a vacuum is formed in the chamber P⁴, which draws in the oil and vapor. The mixed vapors in the horizontal retorts D D', after being subjected to the heat of the products of combustion, pass by the pipes $M^3 M^4$ to the pipe $M^5$, and from thence into the top of the inner retort C', in which they are thoroughly taken up and intermixed by the perforated partitions $C^2$.

It is sometimes necessary to dispense with the steam-supply from an exterior source, and in such a case the chambers J are used as boilers for generating steam, and water instead of steam is introduced thereto by the pipe K. The vapors flow from the inner retort into the outer retort through apertures cut in the cylindrical projection $x^2$ of the inner retort, where they are brought into contact with its highly-heated surfaces, and from thence flow through the pipes T to the point where the gas is required. If the inner retort is dispensed with, however, the gas flows to the point required through the pipe T' in the bottom of the outer retort. This pipe T, when the inner retort is in use, acts as a blow-pipe for blowing off impurities.

The oil-heater is best illustrated in Fig. 9, in which N designates a steam-chamber connected with the steam-pipe M by the pipe N'. The oil enters through the pipe $N^2$, and after passing through the coils $N^3$ passes to the pipes O O' through the pipe $N^4$.

The working of the apparatus is regulated by valves, which are shown in the drawings. Thus by means of the valves 1 2 oil may be made to flow into either or both of the horizontal retorts, and by means of the valves 3 and 4 the steam may be regulated in a similar manner.

The operation of the apparatus is as follows: The steam from the boiler enters the annular superheating chamber J, by the pipe K, either through the coils K' in the chimney or by the direct pipe $K^2$, the regulation of the flow of the steam being effected by the valves $K^3$. After having been heated by the direct action of the heat of combustion in the annular superheating-chamber around the fire-box the steam passes upward by the pipe L, thence downward through the coiled superheating-pipe L', thence upward by the pipe $L^2$, thence downward by the pipe $L^3$, having a valve $L^4$, to the lower coil of the inner spiral superheating pipe or coil B, and thence to the pipe M. In some instances it may be desirable to cut off the flow of steam through the inner spiral superheating coil or pipe B, and this is readily effected by means of the valves $L^4$ and $L^5$, in which case the steam would flow directly from the outside coil to the pipe M through the open valve $L^6$. After leaving the pipe M the steam is divided into two substantially equal parts, which flow, respectively, through the branch pipes M' $M^2$ to the two gangs of horizontal retorts D D', where the oil-vapors and steam are thoroughly intermixed, and the carbon seizes upon the oxygen of the steam and unites with it, at the same time liberating the hydrogen. The gaseous products resulting from the volatilization and the interaction of the steam and hydrocarbon at a high temperature in the horizontal retorts D D', flow through the pipes $M^3$, $M^4$, and $M^5$ to the inner retort C', which is provided with a number of partition-plates, each of which has the form of a spherical segment, having a series of holes through which the mixed steam and hydrocarbon vapors flow downward through the perforations $v$, formed in the cylindrical projection $x^2$, upon which the inner retort rests, to the space between the inner and outer vertical retorts, from where they pass to the gas-eduction pipes. The heated products of combustion from the fire-box rise through the annular flue surrounding the outer retort, and from thence flow into the chamber containing the gangs of retorts D D', which is connected by the flues $D^3$ with the chimney K'.

In another application, filed by me on the 2d day of November, 1889, Serial No. 329,034, I have shown and described an improved construction in gas-generating apparatus which differs from the apparatus shown herein in only having a single vertical retort and in not having the hereinbefore-described annular superheating-chambers, and I do not therefore now desire to claim anything shown in the said application; but What I desire, and claim, is—

1. In a gas-generator, the combination of a fire-box, an annular steam-superheater consisting of chambers communicating with each other arranged around the fire-box, a steam-supply pipe leading to said superheater, an outer coil of pipe arranged above the fire-box, a pipe connecting the said coil with the superheater, an inner spiral superheating-pipe also above the fire-box, a pipe connecting the outer coil with the inner superheating-pipe, horizontal retorts, pipes and branch pipes connecting the inner spiral superheating-pipes with the horizontal retorts, an oil-heater, pipes connecting the oil-heater with the said branch pipes, injectors located at the junction of the two last-named pipes, an outer vertical retort, an inner retort contained therein and having apertures in its base, pipes leading from the horizontal retorts to the top of the said inner vertical retort, and a gas-eduction pipe connected with the outer vertical retort, as and for the purposes described.

2. In a gas-generator, the combination of an outer vertical retort, an inner vertical retort contained therein, horizontal retorts, oil and steam supply pipes connected with the horizontal retorts, pipes connecting the horizontal retorts with the top of the inner retort, a perforated cylindrical projection upon the base of the inner retort, and a gas-eduction pipe connected to the outer retort, as and for the purposes described.

3. In a gas-generator, the combination of an outer vertical retort, an inner vertical retort contained therein, a horizontal retort, oil and steam supply pipes connected with the horizontal retort, a pipe connecting the horizontal retort with the top of the inner retort, a perforated cylindrical projection upon the base of the inner vertical retort contained within the outer retort, apertured curved partition-plates within the inner vertical retort, a removable cap-piece covering the outer retort, and a gas-eduction pipe for the outer vertical retort attached to the said removable cap-piece, as and for the purposes described.

4. The combination of a brick-work furnace structure, an upright annular wall dividing the upper portion of the interior of the furnace structure, an outer spiral coil of pipe contained within the body of the said wall, an inner spiral steam-superheating pipe, and an outer vertical retort within the space inclosed by the said annular wall, an inner vertical retort within the said outer retort and having an aperture in its base, a horizontal retort in the space outside of the said annular wall, a steam-supply pipe connected to the outer coil, a pipe connecting the outer coil with the inner spiral steam-superheating pipe, a pipe connecting the inner spiral steam-superheating pipe with the horizontal retort, a pipe connecting the horizontal retort with the top of the inner vertical retort, a gas-eduction pipe connected with the top of the outer retort, a fire-box below the space inclosed by the annular wall, a chimney, and flues within the furnace structure communicating between the space inclosed by the annular wall and the space outside of said wall and between the last-named space and the chimney, as and for the purposes described.

In testimony whereof I have affixed my signature in presence of two witnesses.

JOHN B. ARCHER.

Witnesses:
W. W. ALDRICK,
CHAS. I. MOREY.